(12) United States Patent
Syed et al.

(10) Patent No.: US 7,571,208 B2
(45) Date of Patent: Aug. 4, 2009

(54) CREATING PROXIES FROM SERVICE DESCRIPTION METADATA AT RUNTIME

(75) Inventors: Harris Syed, Kirkland, WA (US); Andrew D. Milligan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 599 days.

(21) Appl. No.: 11/290,927

(22) Filed: Nov. 30, 2005

(65) Prior Publication Data

US 2007/0124475 A1    May 31, 2007

(51) Int. Cl.
G06F 15/173    (2006.01)
G06F 15/16    (2006.01)

(52) U.S. Cl. .................. 709/203; 709/219; 709/228
(58) Field of Classification Search .............. 709/203, 709/219, 228
See application file for complete search history.

(56) References Cited

U.S. PATENT DOCUMENTS

| | | | | |
|---|---|---|---|---|
| 6,289,391 B1* | 9/2001 | Smith et al. | ................. | 719/312 |
| 6,499,137 B1* | 12/2002 | Hunt | ......................... | 717/164 |
| 7,263,686 B2* | 8/2007 | Sadiq | ......................... | 717/110 |
| 2007/0067437 A1* | 3/2007 | Sindambiwe | ............... | 709/224 |

* cited by examiner

Primary Examiner—Joseph E. Avellino
Assistant Examiner—Jeffrey Seto
(74) Attorney, Agent, or Firm—Workman Nydegger

(57) ABSTRACT

The present invention extends to methods, systems, and computer program products for creating proxies from service description metadata at runtime. A proxy creation request is received from a requesting application while the requesting application is executing at runtime. The proxy creation request requests creation of a proxy instance to facilitate compatible communication between the requesting application and another application. A proxy instance is created in response to the proxy creation request. Service description metadata describing the other application is accessed (e.g., through a request to a metadata service or retrieval from cache). The proxy instance is configured in accordance with the service description metadata describing the other application. Accordingly, the proxy instance can facilitate compatible communication between the requesting application and the other application to implement operations that the requesting application requests to be performed at the other application.

16 Claims, 3 Drawing Sheets

CREATING PROXIES FROM SERVICE DESCRIPTION METADATA AT RUNTIME

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

However, for applications at different computer systems to communicate, the applications must be compatible with one another. For example, for a client application to call a server application, the client application must know the server application's entry points (e.g., data formats, calling conventions, methods, and parameters, etc.), network location, and transport and wire formats used to invoke the server application. In some computing environments, client and server applications are specifically designed together for interoperation. Thus during development, developers can code the client application to facilitate compatible communication with the server application. That is, since the developers are designing client and server applications at the same time and know the entry points, location, and transfer and wire formats of the server application, the developers can build this information into the client application. However, each time a change is made to the server application, the client application may also need to be changed (e.g., recoded and recompiled) and redeployed.

However, in other computing environments, such as, for example distributed computing environments (e.g., the Internet), client and server applications are often not specifically designed for interoperation. That is, client and server applications may be developed by different entities, developed at different times, development for different computing platforms, etc. Thus, in distributed computing environments it may be that a client application and server application (e.g., a remote service) are unable to compatible communicate without the assistance of intermediary modules.

One type of intermediary module that can facilitate compatible communication between applications in a distributed computing environment is a proxy. A proxy is typically constructed for a client application and deployed at the computer system that includes the client application. The proxy includes knowledge of the server application's entry points (e.g., data formats, calling conventions, methods, and parameters, etc.), network location, and transport and wire formats. The proxy is configured to receive calls from the client application and dispatch the calls to the server application. The proxy is also configured to manage a communication channel using the transport and wire formats. For example, in response to a client application request, the proxy can open a channel to the server application, format and send a request message, receive any response messages, and format the responses for transfer back to the client application. Thus, a proxy is an intermediary module with knowledge of the server application that facilities compatible communication between an otherwise incompatible client application and the server application (e.g., translated data formats, etc.).

A proxy for a server application can be developed along with the server application. Then, when the server application is deployed, the proxy is also deployed for any client applications that may attempt to utilize the server application. Proxies can be hand coded or created using automated application component frameworks.

More recently, many server applications have been developed to include metadata that describes the server application's operation. For example, Web service applications can be described using Web Service Description Language ("WSDL"). Metadata describing a server application can be stored in a common and/or well-known location. Thus, during the development client applications, the client application developers can access the metadata. Based on the metadata, the client application developers can develop proxies for their client applications. The proxies can then be compiled and deployed along the client application to facilitate compatible communication with a corresponding server application. This is advantageous since server application developers, which may have no way to know what subsequent client applications might be used with a sever application, are relieved from having to develop proxies for their server applications.

Unfortunately, when aspects of a server application are modified (e.g., interfaces, formats, etc), any proxies used to access the server application typically have to be regenerated (e.g., recoded and recompiled) and redeployed. Failure to regenerate a proxy when aspects of a server application are modified, can result in an existing proxy being unable to connect to any new or modified functionality of the server application or being unable to connect to the server application at all. For example, even existing calls may not function the same after aspects of a server application are modified.

Further, proxy deployment of client applications and proxies can be difficult when an entity is responsible for a large number of computer systems having client applications. Every time a client application or proxy is regenerated, the new client application or proxy typically has to be redeployed to every computer system. Further, deployment of applications and proxies can be limited to personnel with administrative privileges that can delay deployment. For example, some deployment mechanisms have a registration phase, which can only be executed by an administrator.

BRIEF SUMMARY

The present invention extends to methods, systems, and computer program products for creating proxies from service description metadata at runtime. A proxy creation request is received from a requesting application while the requesting application is executing at runtime. The proxy creation request requesting creation of a proxy instance to facilitate compatible communication between the requesting application and another application.

A proxy instance is created in response to the proxy creation request. Service description metadata describing the other application is accessed. In some embodiments, a metadata request, requesting service description metadata describing the other application, is sent to a metadata service. In response to the request, service description metadata describing the other application is received from the metadata service. In other embodiments, previously cached service description metadata describing other application is retrieved from a cache.

The proxy instance is configured in accordance with the service description metadata describing the other application. Accordingly, the proxy instance can facilitate compatible communication between the requesting application and the other application to implement operations that the requesting application requests to be performed at the other application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
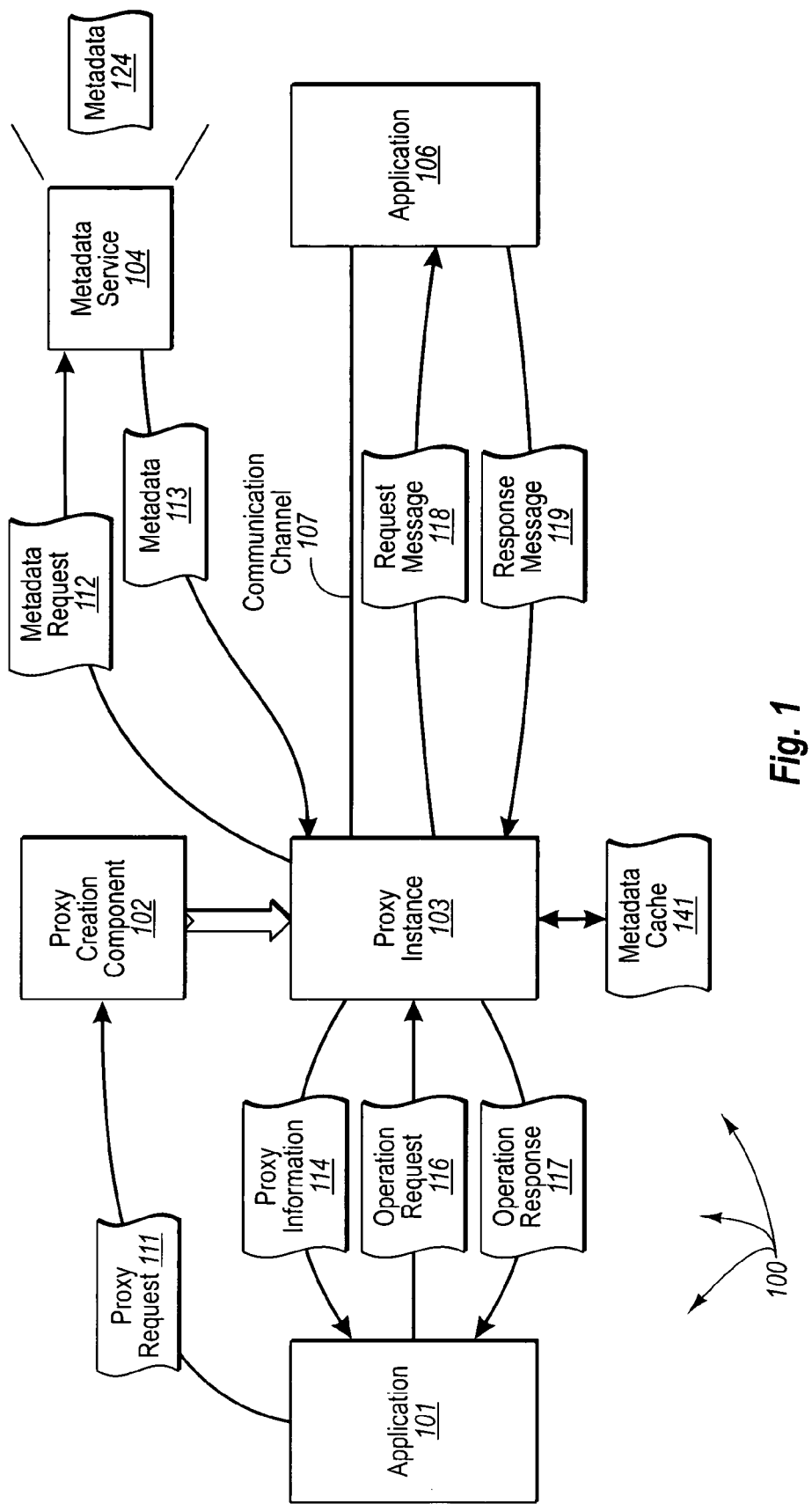
FIG. 1 illustrates an example computer architecture that facilitates creating proxies from service description metadata at runtime.

The present invention extends to methods, systems, and computer program products for creating proxies from service description metadata at runtime. A proxy creation request is received from a requesting application while the requesting application is executing at runtime. The proxy creation request requesting creation of a proxy instance to facilitate compatible communication between the requesting application and another application.

A proxy instance is created in response to the proxy creation request. Service description metadata describing the other application is accessed. In some embodiments, a metadata request, requesting service description metadata describing the other application, is sent to a metadata service. In response to the request, service description metadata describing the other application is received from the metadata service. In other embodiments, previously cached service description metadata describing other application is retrieved from a cache.

The proxy instance is configured in accordance with the service description metadata describing the other application. Accordingly, the proxy instance can facilitate compatible communication between the requesting application and the other application to implement operations that the requesting application requests to be performed at the other application.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise, computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates creating proxies from service description metadata at runtime. Depicted in computer architecture 100 are various components including application 101, proxy creation module 102, proxy instance 103, metadata service 104, and application 106. Each of the various components can be connected to a network, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components can exchange Simple Object Access Protocol ("SOAP") envelopes containing Web service related data. In some embodiments, application 101 and application 106 are different portions of a distributed application, such as, for example, a Web services application.

Generally, proxy creation component 102 is configured to receive proxy creation requests from running applications and, in response to a request, automatically create an appropriate proxy instance (e.g., proxy instance 103). A created proxy instance can be configured to invoke the functionality for a remote service. A proxy instance can thus function as a translator to facilitate compatible communication between applications that otherwise can not communicate or that have limited communication such that one application can not utilize the full functionality of another application. Proxy creation component 102 can receive calls from applications (e.g., application 101) developed in any variety of different computer languages, including VB Script, Visual Basic for Applications, Python, and JavaScript.

Generally, metadata service 104 is configured to access service description metadata describing applications. Metadata service 104 can be part of an application (e.g., application 106) or separately hosted component. Metadata service 104 can access service description metadata from any number of different locations including a metadata registry (e.g., a Universal Description, Discovery and Integration ("UDDI") registry or a local registry), a store, an examination of a running service component, or a file. Metadata service 104 can receive metadata requests from and return metadata to a proxy creation component and/or a proxy instance as appropriate.

A proxy creation component (e.g., proxy creation component 102) and/or a proxy instance can cache received metadata for use in creating subsequent proxies. Thus, proxy instances may be able to be created without having to query metadata service 104. A proxy creation component can include a mechanism to invalidate and/or flush cache entries, for example, when metadata changes or after a specified time.

Figure 2:
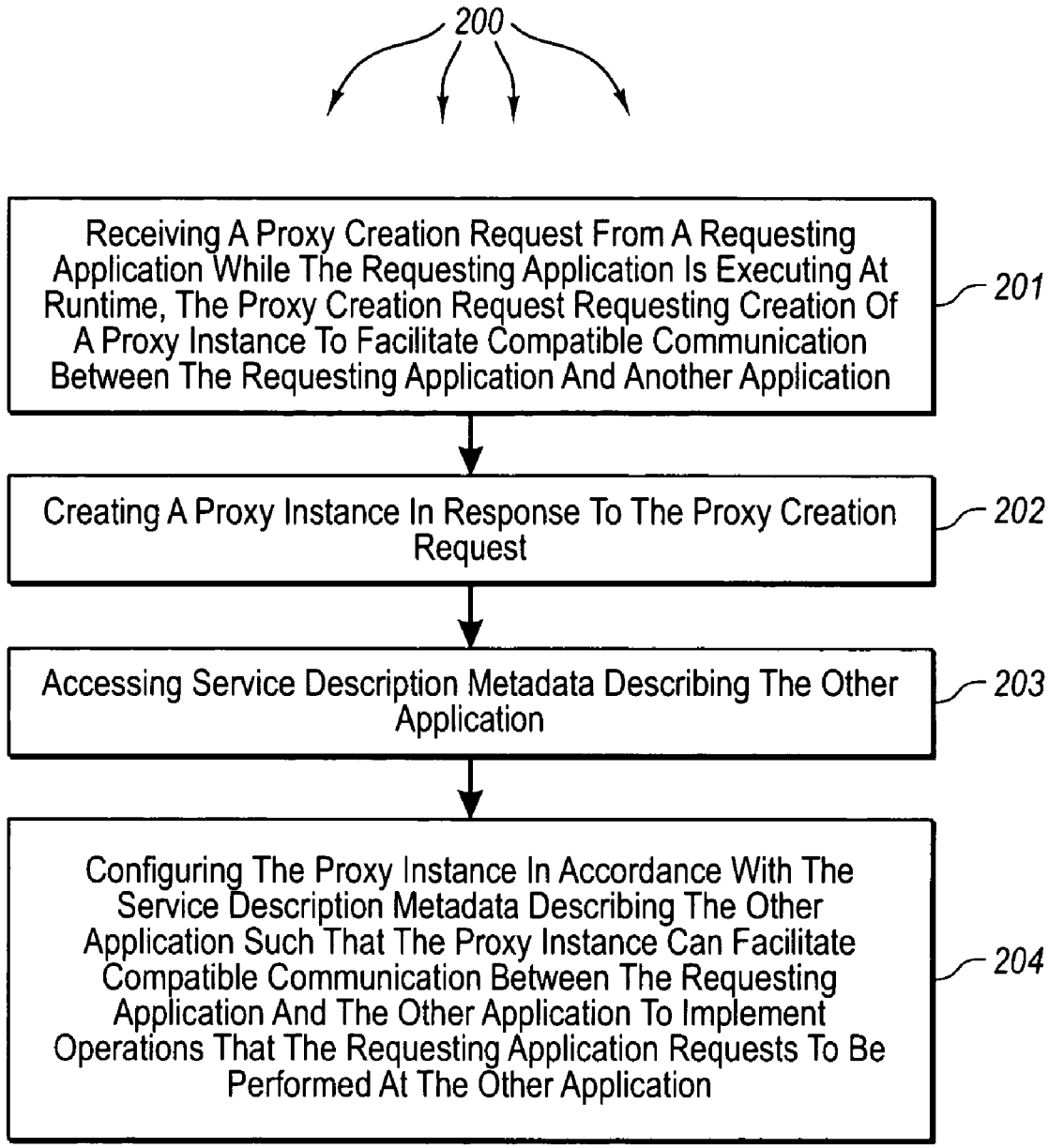
FIG. 2 illustrates a flow chart of an example method for creating proxies from service description metadata at runtime.

FIG. 2 illustrates a flow chart of an example method 200 for creating proxies from service description metadata at runtime. Method 200 will be described with respect to the components and data in computer architecture 100. During execution at runtime, application 101 can send a request for establishment of a proxy instance to facilitate compatible communication with application 106. For example, application 101 can send proxy request 111 to proxy creation component 102.

Method 200 includes an act of receiving a proxy creation request from an requesting application while the requesting application is executing at runtime (act 201). The proxy creation request requesting creation of a proxy instance to facilitate compatible communication between the requesting application and another application. For example, proxy creation component 102 can receive proxy request 111 from application 101 (a Web services client) while application is executing at runtime. Proxy creation request 111 can include a request for creation of a proxy instance to facilitate compatible communication between application 101 and application 106.

A proxy creation request can restrict the creation of proxy instances to proxy instances that communicate with applications described by specified metadata. For example, a proxy creation request can request that a proxy instance be created only when metadata describing the other application indicates that the other application can receive communication at a specified address and/or uses a specified binding.

Method 200 includes an act of creating a proxy instance in response to the proxy creation request (act 202). For example proxy creation component 102 can create proxy instance 103 in response to receiving proxy request 111. A created proxy instance can be configured to map between a message format of the requesting application and message format of the other application. For example, proxy instance 103 can be created to map between Component Object Model ("COM") messages and Simple Object Access Protocol ("SOAP") messages.

Method 200 includes an act of accessing service description metadata describing the other application (act 203). In some embodiments, a metadata request is sent to a metadata service. The metadata request requests service description metadata describing the other application. For example, proxy instance 103 can send metadata request 112 to metadata service 104. Metadata request 104 can be a request for service description metadata describing application 106.

In response to metadata request 112, metadata service 104 can identify at least a portion of metadata 124 as being relevant to metadata request 112. For example, metadata service 104 can identify metadata 113 (e.g., an address, binding, and contract) as service description metadata describing application 106. Alternately, metadata service 104 can return all of metadata 124 in response to metadata request 112. Returned metadata can indicate the operations the described application is configured to perform.

In these embodiments, service description metadata describing the other application can be received from the metadata service. For example, proxy instance 103 can receive metadata 113 from metadata service 104. As described, metadata 113 can include at least service description metadata describing application 106. In response to receiving metadata 113, proxy instance 103 can cache metadata 113 in metadata cache 141 for use in subsequent creation of other proxies. Metadata cache 141 can be a portion of system memory or a portion of a storage device, for example, that is locally accessible to proxy creation component 102.

Thus in other embodiments, accessing service description metadata describing the other application includes retrieving cached service description metadata. For example, proxy instance 103 can retrieve cached metadata (e.g., metadata 113 received in response to a previous metadata request) from metadata cache 141. Cached metadata may have been cached by proxy creation component 102 or a previously created proxy instance. Accessing cached metadata can reduce network traffic. Proxy creation component 103 can include a mechanism to invalidate and/or flush cache entries, for example, when metadata changes or after a specified time.

Method 200 includes an act of configuring the proxy instance in accordance with the service description metadata describing the other application (act 204). Accordingly, the proxy instance can facilitate compatible communication between the requesting application and the other application to implement operations that the requesting application requests to be performed at the other application. For example, proxy instance 103 can be configured in accordance with metadata 113 to facilitate compatible communication between the application 101 and application 106 Compatible communication (e.g., mapping between COM and SOAP messages) can then be used to implement operations that the application 101 requests to be performed at the application 106. In embodiments where metadata service 104 returns all of metadata 124 to proxy instance 103, proxy instance 103 and/or proxy creation component 102 can process the return metadata to identify service description metadata describing application 106.

Thus, embodiments of the present invention include a generic proxy component that gains application specific behavior at runtime. The generic proxy component is has increased stability since it retrieves the service description data at runtime rather than compile time. Accordingly, the generic proxy component can generate appropriate proxies (without having to be updated) even when service description metadata describing an application changes.

Subsequent to configuration, proxy instance 103 can be used to facilitate compatibly communication between application 101 and application 106. Proxy instance 103 can send proxy information (e.g., indication that proxy instance 103 is appropriately configured and how to reach proxy instance 103) to application 101. Once proxy instance 103 is configured, application 101 can send operation requests to proxy instance 103. Operation requests can request that an operation be performed at application 106. For example, application 101 can send operation request 116 (e.g., a COM message) to proxy instance 103. Operation request 116 can request an operation that was described in metadata 113 as being an operation application106 can perform.

Proxy instance 103 can receive operation requests from application 101. For example, proxy instance 103 can receive operation request 116 from application 101. In response to receiving an operation request (e.g., an initial operation request), proxy instance 103 can establish a communication channel to another application in accordance with received service description metadata. For example, in response to receiving operation request 116, proxy instance 103 can establish communication channel 107 to application 106 in accordance with metadata 113 (e.g., an address and a binding).

Proxy instance 103 can interpret operation request 116 to formulate an appropriate request message to send over communication channel 107 (e.g., mapping from a COM message to a SOAP message). For example, proxy instance 103 can formulate request message 118 (e.g., an appropriate on-the-wire request message) in accordance with metadata 113 based on the contents of operation request 116. Proxy instance 103 can send request message 118 to application 106 over communication channel 107.

Application 106 can receive and process request message 118. Application 106 can then send response message 119 (e.g., a SOAP message or other appropriate on-the-wire response message) to proxy instance 103 over communication channel 107. Proxy instance 103 can receive response message 119 and interpret response message 119 to formulate an appropriate operation response to send to the request application (e.g., mapping a SOAP message to a COM message). For example, proxy instance 103 can formulate operation response 117 as a response to operation request 116. Proxy instance 103 can send operation response 117 to application 101. Application 101 can receive operation response 117.

Proxy instance 103 can facilitate communication between application 101 and application 106 for any number of requests and responses. After one or more requests and responses, application 101 can send a proxy close request to proxy instance 103. The proxy close request can request that proxy instance 103 be closed. Proxy instance 103 can receive the proxy close request from application 101 and in response can close communication channel 107. Also in response to the proxy close request, proxy instance 103 can be closed by itself and/or by proxy creation module 102.

It may be that at some time after proxy instance 103 is closed, metadata 113 is changed as a result of program updates to application 106. Subsequent to the change in metadata 113, application 101 can send a second proxy request to proxy creation component 102. Any proxy instance created as a result of receiving the second proxy request can be configured in accordance with changes to metadata 113 to increase the likelihood of continued compatibility with the program updates to application 106.

Figure 3:
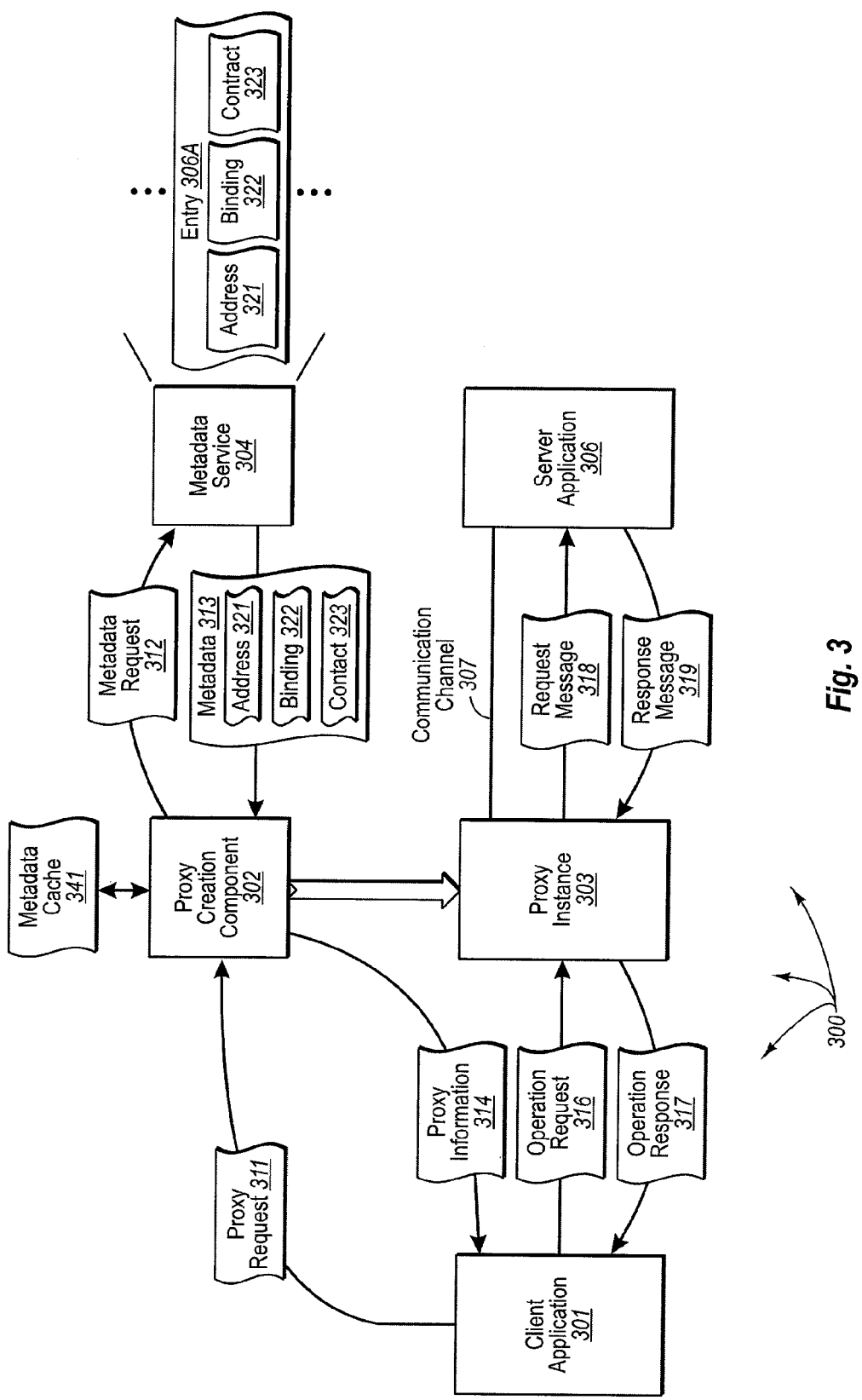
FIG. 3 illustrates a second example computer architecture that facilitates creating proxies from service description metadata at runtime.

FIG. 3 illustrates a second example computer architecture 300 that facilitates creating proxies from service description metadata at runtime. As depicted, computer architecture 300 includes client application 301, proxy creation component 302, proxy instance 303, metadata service 304, and server application 306. The components of computer architecture 300 function similar to the components of computer architecture 100.

Client application 301 can be a Web Services client and server application 306 can be a Web service. From time to time, client application 301 can attempt to invoke the services of server application 306. Proxy creation component 302 can create proxy instances (e.g., proxy instance 303) to facilitate communication between client application 301 and server application 303. Metadata service 304 can access metadata entries (e.g., metadata entry 306A) from a metadata registry, store, and/or file. Metadata entries can include metadata (e.g., in Web Services Description Language ("WSDL") format) describing a corresponding Web service. For example, entry 306A can describe aspects of server application 306.

A metadata entry can include an address (e.g., address 321) describing the network location of a Web service, a binding (e.g., binding 322), specifying how an application or proxy can connect to the Web service, and a contract (e.g., contract 323) that specifies the operations and/or parameters that are supported at the address. A binding can include configuration information, such as, for example network transports, wire protocols, and data encodings. A proxy instance (e.g., proxy instance 303) can utilize the WS-Metadata Exchange Protocol to obtain metadata from metadata service 304.

Client application 301 can include code for sending a proxy request to proxy creation component 302. The following is an example of code that can be included in client application 301:

```
Set Proxy = GetObject(
    service:mexAddress="<URL for Metadata Service 304>",
    contract=IAffiliate,
    contractNamespace=<URL for Contract Namespace>,
    binding=WSHttpBinding__IAffiliate,
    bindingNamespace= <URL for Binding Namespace>,
)
result = Proxy.Operation1 (parameter1, parameter2)
Set Proxy = null
```

Within the code example, the GetObject call causes a proxy request (e.g., proxy request 311) to be sent to proxy creation component 302. The GetObject call includes a parameter for the address of the (mexAddress) metadata service (e.g., metadata service 304). Since metadata service 304 can access metadata describing many different application contracts and bindings, the GetObject call also includes parameters to specify which contract (contract & contractNamespace) and binding (binding & bindingNamespace) are to be used. For example, these parameters can specify contract 323 and binding 322.

Proxy creation component 302 can use the parameters to create an appropriate proxy instance to facilitate compatible communication between client application 301 and server application 306. For example, after receiving the parameters, proxy creation component 302 can send metadata request 312 (e.g., in accordance with the WS-Metadata Exchange Protocol) to metadata server 304 (e.g., at the specified mexaddress). In response to metadata request 312, metadata service 304 can return metadata 313 (e.g., in accordance with the WS-Metadata Exchange Protocol) to proxy creation component 302. Metadata 313 can include metadata from entry 306A as well as any other metadata accessible to metadata service 304.

Proxy creation component 302 can parse and/or filter metadata 313 to identify metadata matching the values of the contract, contractNamespace, binding, and bindingNamespace parameters. For example, proxy creation component 302 can determine that the name of contract 323 is "IAffiliate" and the value of binding 322 is "WSHttpBinding_IAffiliate". Proxy creation component 302 can then determine that address 321 is related to contract 323 and binding 322. Accordingly, from within metadata 313, proxy creation component 302 can identify address 321, binding 322, and contract 323 as the relevant metadata for creating a proxy instance to facilitate compatible communication between client application 301 and server application 306.

Accordingly, based at least on address 321, binding 322, and contract 323, proxy creation component 302 can create proxy instance 303. "Set Proxy" can be set to the return value of the GetObject call (e.g., proxy information 314) to identify proxy instance 303 to client application 301.

In response to receiving metadata 313, proxy creation component 303 can cache metadata 313 (e.g., in metadata cache 341) for use in subsequent creation of other proxies. For example, proxy instance 303 can cache metadata 313 to system memory or to a local storage device.

Alternately (to sending metadata request 312 and receiving metadata 313), proxy creation component 302 can access service description metadata (e.g., metadata 313) from cached metadata 341 (e.g., received in response to a previous metadata request). Cached metadata may have been cached by proxy creation component 302 or a previously created proxy instance. Accessing cached metadata can reduce network traffic. Proxy creation component 303 can include a mechanism to invalidate and/or flush cache entries, for example, when metadata changes or after a specified time.

Client application 301 can then issue contract operation requests to proxy instance 303. For example, client application 301 can issue contract operation request 316 (e.g., a call to Proxy.Operation1 with the parameters "parameter1" and "parameter2") to proxy instance 303. "Operation1" can be an operation in the metadata describing contract 323. In response to the call, proxy instance 303 can establish communication channel 301 and format contract operation request 316 into request message 318 (e.g., converting "Operation1" into a compatible format for transfer to server application 306). Proxy instance 303 can then send request message 318 to server application 306 (over communication channel 307).

Server application 306 can receive request message 318 (over communication channel 307). Server application 306 can process request message 318 and perform "Operation1". Server application 306 can include an indication of the results of "Operation1" in response message 319. Server application can send response message 319 to proxy instance 303 (over communication channel 307).

Proxy instance 303 can receive response message 319 indicating the results of "Operation1" (over communication channel 307). Proxy instance 303 can translate response message 319 into contract operation response 317 (a compatible format for transfer to client application 301). Proxy instance 303 can send contract operation response 317 to client application 301 (e.g., setting "result" equal to the return value of the Proxy.Operation1 call).

At the request of client application 301 (and potentially after issuance of one or more other operation requests), proxy instance 303 can close communication channel 301 and be shut down.

An application can instruct a proxy creation component to restrict proxy instance creation based on returned metadata. In some embodiments, a client application can provide a proxy creation component with additional metadata criteria that are to be satisfied before creating a proxy instance. For example, a client application can include code for restricting establishment of a proxy instance based on a server application being configured to communicate at a specified address. The following is a second example of code that can be included at an application to restrict creation of a proxy instance:

```
Set Proxy = GetObject(
    service:mexAddress="<URL for Metadata Service 304>",
    address="<specified URL for Application 306>",
    contract=IAffiliate,
    contractNamespace=<URL for Contract Namespace>,
    binding=WSHttpBinding_IAffiliate,
    bindingNamespace= <URL for Binding Namespace>,
)
result = Proxy.Operation1(parameter1, parameter2)
Set Proxy = null
```

The second code example restricts created proxy instances to communicating with application 306 at the "<specified URL for Application 306>". Proxy instance creation is not allowed for communicating with Application 306 at other URLs. If returned metadata describes that communication with Application 306 is possible at the <specified URL for Application 306>", a proxy instance can be created. If returned metadata describes that communication with Application 306 not possible at the <specified URL for Application 306>", a proxy instance is not created Embodiments of the present invention can be used to map between Component Object Model ("COM") based messages and Simple Object Access Protocol ("SOAP") message. For example, within computer architecture 300, it may be that contract operation request 316 and contract operation response 317 are COM based messages and request message 318 and response message 319 are SOAP based message.

Embodiments of the present invention can be used during proxy instance initialization. For example in FIG. 1, proxy instance 103 (a created proxy instance) can access metadata for initialization and initialize itself in accordance with returned metadata. Alternately, embodiments of the present invention can also be used during proxy instance creation. For example in FIG. 3, proxy creation component 302 can access metadata and create a proxy instance in accordance with received metadata.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a proxy creation component, the proxy creation component connected to a network along with a client application, a server application, and a metadata service, the proxy creation component, the client application, the server application, and the metadata service each hosted separately from one another on the computer network, the proxy creation component, the client application, the server application, and the metadata service configured to use network communication to communicate with another, a method for creating a proxy to facilitate communication between the client application and the server application during client application runtime, the method comprising:

while the client application is executing at runtime:

an act of the proxy creation component receiving a proxy creation request from the client application, the proxy creation request message requesting creation of a proxy instance to facilitate compatible network communication between the client application and the server application, the proxy creation request specifying metadata values to be used for compatible network communication;

an act of the proxy creation component creating a proxy instance in response to the proxy creation request;

an act of the proxy creation component sending a network metadata request message to the metadata service, the network metadata request message requesting service description metadata describing the server application, the metadata service maintaining metadata service descriptions describing a plurality of different server applications such that metadata service descriptions describing the plurality of different server applications are centrally accessible via network communication;

an act of proxy creation component receiving a network response message from the metadata service, the network response message including service description metadata describing the server application;

an act of proxy creation component parsing the service description metadata to identify metadata matching the metadata values specified in the proxy creation request;

an act of the proxy creation component configuring the proxy instance in accordance with the identified metadata such that the proxy instance can facilitate compatible communication between the client application and the server application without having to conduct negotiations between the client application and server application while the client application is executing at runtime;

wherein the configured proxy instance facilitates communication between the client application and the server application, comprising:

an act receiving an operation request from the client application, the operation request requesting that an operation be performed at the server application, the operation described in the contract metadata for the server application;

an act of establishing a communication channel to the server application accordance with the identified metadata in response to operation request;

an act of interpreting the operation request to formulate an appropriate request message to send over the established communication channel, the request message configured to indicate to the server application that it is to perform the operation;

an act of sending the request message to the server application;

an act of receiving a response message from the server application, the response message indicating the outcome of performing the operation;

an act of interpreting the response message to formulate an appropriate operation response to send to the client application, the operation response configured to indicate outcome of the operation to the client application; and an act of sending the operation response to the client application.

2. The method as recited in claim 1, wherein the act of receiving a proxy creation request from a client application comprises an act of receiving a proxy creation request from a Web services client application.

3. The method as recited in claim 1, wherein the act of receiving a proxy creation request from a client application comprises an act of receiving a proxy creation request that restricts proxy instance creation to proxy instances that communicate with applications described by specified metadata.

4. The method as recited in claim 3, wherein the act of receiving a proxy creation request that restricts proxy instance creation to proxy instances that communicate with applications described by specified metadata comprises an act of receiving a proxy creation request that restricts proxy instance creation to proxy instances that communicate with an application at a specified address.

5. The method as recited in claim 1, wherein the act of creating a proxy instance in response to the proxy creation request comprises an act of creating a proxy instance configured to map between Component Object Model messages and Simple Object Access Protocol messages.

6. The method as recited in claim 1, wherein the act of receiving a network response message from the metadata service comprises an act of receiving address metadata, binding metadata, and contract metadata describing for a Web service.

7. The method as recited in claim 1, wherein the act of receiving a network response message from the metadata service comprises an act of receiving contract metadata indicative of the operations a Web service is configured to perform.

8. The method as recited in claim 1, wherein the act of configuring the proxy instance in accordance with the identified metadata comprises an act of configuring the proxy instance to map between Component Object Model messages and Simple Object Access Protocol Messages so as to facilitate communication between the client application and a Web service.

9. The method as recited in claim 1, wherein the act receiving an operation request from the client application comprises an act of receiving a Component Object Model message.

10. The method as recited in claim 1, wherein the act of establishing a communication channel to the server application in accordance with the service description metadata comprises an act of establishing a communication channel in accordance with address and binding metadata received from the metadata service.

11. The method as recited in claim 1, where the act of receiving a response message from the server application comprises an act of receiving a Simple Object Access Protocol message.

12. The method as recited in claim 1, further comprising:
an act of receiving a proxy close request from the client application, the proxy close request requesting that the proxy instance be closed; an act of closing the established communication channel in response to the proxy close request; and an act of closing the proxy instance in response to the proxy close request.

13. The method as recited in claim 1, further comprising caching
the identified metadata for use in creating subsequent proxy instances to facilitate communication between the client application the server application.

14. A computer program product for use at a proxy creation component, the proxy creation component connected to a network along with a client application, a server application, and a metadata service, the proxy creation component, the client application, the server application, and the metadata service each hosted separately from one another on the computer network, the proxy creation component, the client application, the server application, and the metadata service configured to use network communication to communicate with another, the computer program product for implementing a method for facilitating communication between the client application and the server application during client application runtime, the computer program product comprising one or more computer-readable storage media having stored thereon computer-executable instructions that, when executed by a processor, cause the proxy creation component to perform the following:
while the client application is executing at runtime:
receive a proxy creation request from the client application, the proxy creation request requesting creation of a proxy instance to facilitate compatible network communication between the client application and the server application, the proxy creation request specifying metadata values to be used for compatible network communication;
create a proxy instance in response to the proxy creation request;
send a network metadata request message to the metadata service, the network metadata request message requesting service description metadata describing the server application, the metadata service maintaining metadata service descriptions describing a plurality of different server applications such that metadata service descriptions describing the plurality of different server applications are centrally accessible via network communication;
receive a network response message from the metadata service, the network response message including service description metadata describing the server application; parse the service description metadata to identify metadata matching the metadata values specified in the proxy creation request; and
configure the proxy instance in accordance with the identified metadata such that the proxy instance can facilitate compatible communication between the client application and the server application without having to conduct negotiations between the client application and server application while the client application is executing at runtime;
receive an operation request from the client application, the operation request requesting that an operation be performed at the server application, the operation described in the contract metadata for the server application;
establish a communication channel to the server application in accordance with the identified metadata in response to operation request;
internet the operation request to formulate an appropriate request message to send over the established communication channel, the request message configured to indicate to the server application that it is to perform the operation;
send the request message to the server application;
receive a response message from the server application, the response message indicating the outcome of performing the operation;
internet the response message to formulate an appropriate operation response to to
send to the client application, the operation response configured to indicate outcome of the operation to the client application; and
send the operation response to the client application.

15. The computer program product as recited in claim 14, wherein the computer program product further comprises one or more computer-readable storage media having stored thereon computer-executable instructions that, when executed by a processor, cause the computer system to perform the following:
receive a proxy close request from the client application, the proxy close request requesting that the proxy instance be closed;
close the established communication channel in response to the proxy close request; and
close the proxy instance in response to in response to the proxy close request.

16. A computer system, the computer system connected to a network along with a client application, a server application, and a metadata service, the computer system, the client application, the server application, and the metadata service each hosted separately from one another on the computer network, the computer system, the client application, the server application, and the metadata service configured to use network communication to communicate with another, the client application configured to use COM messaging and the server application configured to user SOAP messaging the computer system comprising:
one or more processors;
system memory; and one or more computer-readable storage media having stored thereon a proxy creation module configured to:
while the application is executing at runtime:
receive a proxy creation request from the client application , the proxy creation request requesting creation of a proxy instance to facilitate compatible network communication between the client application and the server application, the proxy creation request including parameters indicating a contract, binding, and address that are to be used for compatible network communication;
create a proxy instance in response to the proxy creation request;
send a network metadata request message to the metadata service, the network metadata request message requesting service description metadata describing the server application, the metadata service maintaining metadata service descriptions describing a plurality of different server applications such that metadata service descriptions describing the plurality of different server applications are centrally accessible via network communication;

receive a network response message from the metadata service, the network response message including service description metadata describing the server application;

parse the service description metadata to identify metadata matching the parameters indicating a contract, binding, and address included in the proxy creation request; and configure the proxy instance in accordance with the identified metadata such that the proxy instance can facilitate compatible communication between the client application using COM messaging and the server application using SOAP messaging without having to conduct negotiations between the client application and server application while the client application is executing at runtime;

receive an operation request from the client application, the operation request requesting that an operation be performed at the server application, the operation described in the contract metadata for the server application:

establish a communication channel to the server application in accordance with the identified metadata in response to operation request;

internet the operation request to formulate an appropriate request message to send over the established communication channel, the request message configured to indicate to the server application that it is to perform the operation;

send the request message to the server application;

receive a response message from the server application, the response message indicating the outcome of performing the operation;

internet the response message to formulate an appropriate operation response to send to the client application, the operation responce configured to indicate outcome of the operation to the client application; and send the operation response to the client application.

* * * * *